US007624233B2

United States Patent
Kavian

(10) Patent No.: US 7,624,233 B2
(45) Date of Patent: Nov. 24, 2009

(54) PORTABLE STORAGE DEVICE

(75) Inventor: Nasrollah A. Kavian, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 472 days.

(21) Appl. No.: 11/508,051

(22) Filed: Aug. 22, 2006

(65) Prior Publication Data
US 2008/0052461 A1 Feb. 28, 2008

(51) Int. Cl.
G06F 12/00 (2006.01)
(52) U.S. Cl. .......................................... 711/115; 710/13
(58) Field of Classification Search .................. 711/115; 710/13
See application file for complete search history.

(56) References Cited

U.S. PATENT DOCUMENTS

| 6,701,450 | B1 | 3/2004 | Gold et al. | |
|---|---|---|---|---|
| 2005/0062888 | A1* | 3/2005 | Wood et al. | 348/553 |
| 2005/0066129 | A1* | 3/2005 | Chang et al. | 711/115 |
| 2005/0109841 | A1* | 5/2005 | Ryan et al. | 235/380 |
| 2005/0157187 | A1* | 7/2005 | Bin | 348/231.7 |
| 2007/0109271 | A1* | 5/2007 | Wang | 345/173 |
| 2007/0112979 | A1* | 5/2007 | Peng | 710/8 |
| 2007/0236470 | A1* | 10/2007 | Abanami et al. | 345/173 |

OTHER PUBLICATIONS

3D2F.COM Software Directory Search Results, http://3d2f.com/tags/create/image/cd/ at least as early as Aug. 2, 2006, 13 pages.
3D2F.COM Software Directory Search Results, http://3d2f.com/tags/image/copy/ at least as early as Aug. 2, 2006, 13 pages.
7Tools Virtual CD Emulator, http://www.fileboost.net/directory/utilities/system/7tools_virtual_cd_emulator/017602/review.html at least as early as Aug. 2, 2006, 2 pages.

* cited by examiner

Primary Examiner—Christian P Chace
Assistant Examiner—Hashem Farrokh

(57) ABSTRACT

Portable storage devices and methods of configuring portable storage devices are disclosed. In an exemplary implementation, a method for configuring a portable storage device may include receiving user input on a portable storage device indicating a mode of operation of the portable storage device. The method may also include receiving user input on the portable storage device indicating a file selection for one of a plurality of image files stored on the portable storage device. The method may also include providing access by an external computer system to the selected image file based on the selected mode of operation.

18 Claims, 4 Drawing Sheets

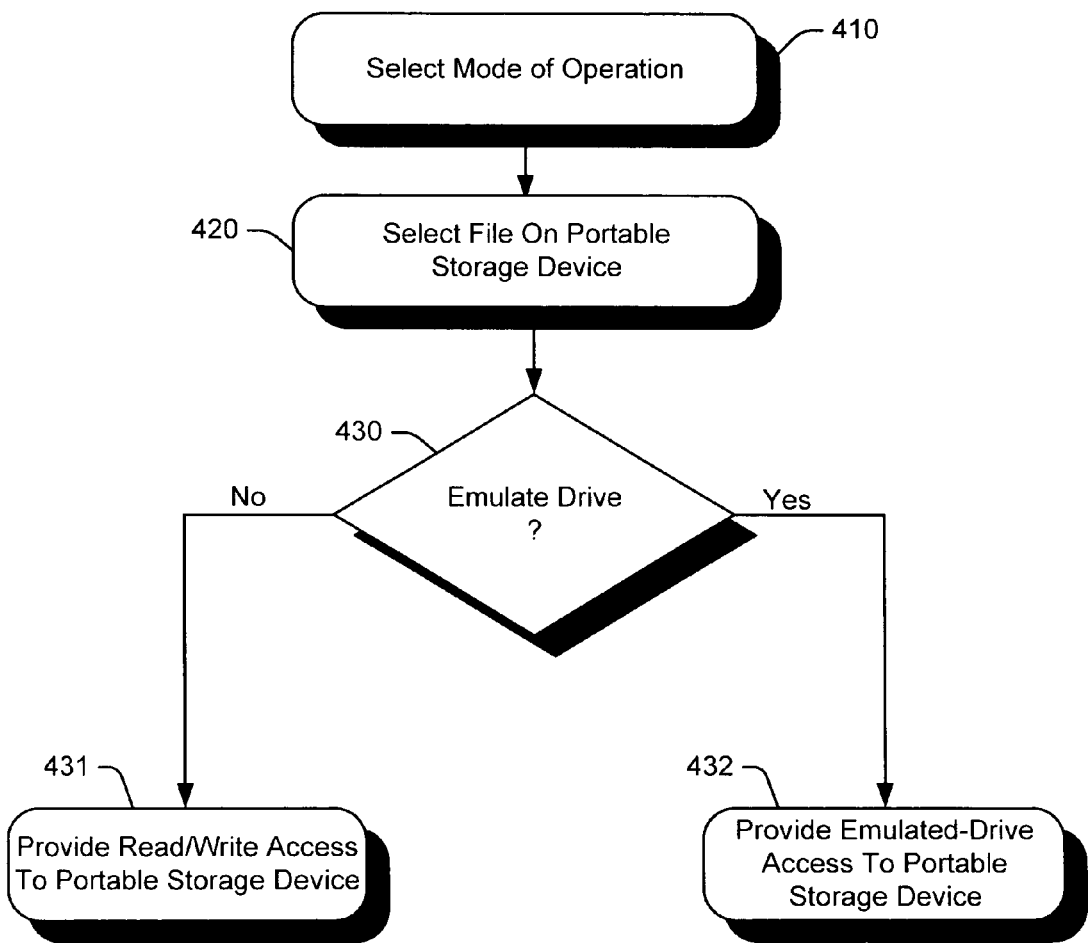

PORTABLE STORAGE DEVICE

BACKGROUND

Multiple files may be written to a compact disc (CD) or digital versatile disk (DVD) as a single image file (e.g., according to the ISO 9660 standard). These single image files are commonly used on installation disks (e.g., for operating systems and application software). The single image file contains all of the data files, executable files, etc., for installing the software on a computer system. The location of each individual file is specified according to a location or offset on the CD or DVD disk. Therefore, the user typically cannot access the contents of an image file from a computer hard disk drive by simply copying the image file to the hard disk drive. Instead, the contents of the image file must be accessed from the CD or DVD disk itself via a CD or DVD drive.

Software is available that allows users to copy image files to a hard disk drive and then write the image files to another CD or DVD disk (e.g., for making backup disks). However, CD and DVD disks are not as durable or reliable as hard disk drives. Software is also available that allows users to copy image files from a CD or DVD disk to a hard disk drive and then access the contents of the image files from the hard disk drive. If the hard disk drive crashes, however, the user can no longer access these image files, and accordingly cannot be used for bootable image files (e.g., for installing the operating system).

BRIEF DESCRIPTION OF THE DRAWINGS

FIG. 4 is a flowchart illustrating exemplary operations for configuring portable storage device.

DETAILED DESCRIPTION

Portable storage devices and methods of configuring portable storage devices are disclosed. In an exemplary embodiment, the portable storage device may be implemented as a universal serial bus (USB) drive (also commonly called "thumb drives"). The portable storage device is more durable and more reliable than CD and DVD disks. In addition, one or more image file may be stored on the portable storage device, and the portable storage device may then emulate a CD or DVD drive so that the image file(s) can be accessed, e.g., for installing software on one or more computer systems.

In an exemplary embodiment, the image file may be an ISO 9660 data structure. ISO 9660 data structures contain all the contents of multiple files in a single binary file, called the image file. Briefly, ISO 9660 data structures include volume descriptors, directory structures, and path tables. The volume descriptor indicates where the directory structure and the path table are located in memory. The directory structure indicates where the actual files are located, and the path table links to each directory. The image file is made up of the path table, the directory structures and the actual files. The ISO 9660 specification contains full details on implementing the volume descriptors, the path table, and the directory structures. The actual files are written to the image file at the sector locations specified in the directory structures.

Although the portable storage device is not limited to use with image files, when used with image files, the portable storage device may be implemented as a system recovery disk and/or as a bootable disk (e.g., to install an operating system on a computer system). In addition, multiple image files may be stored on the portable storage device and the user can select which of the image files to access (e.g., between software application #1 and software application #2) without the need for separate software to view the contents on the portable storage device.

Figure 1:
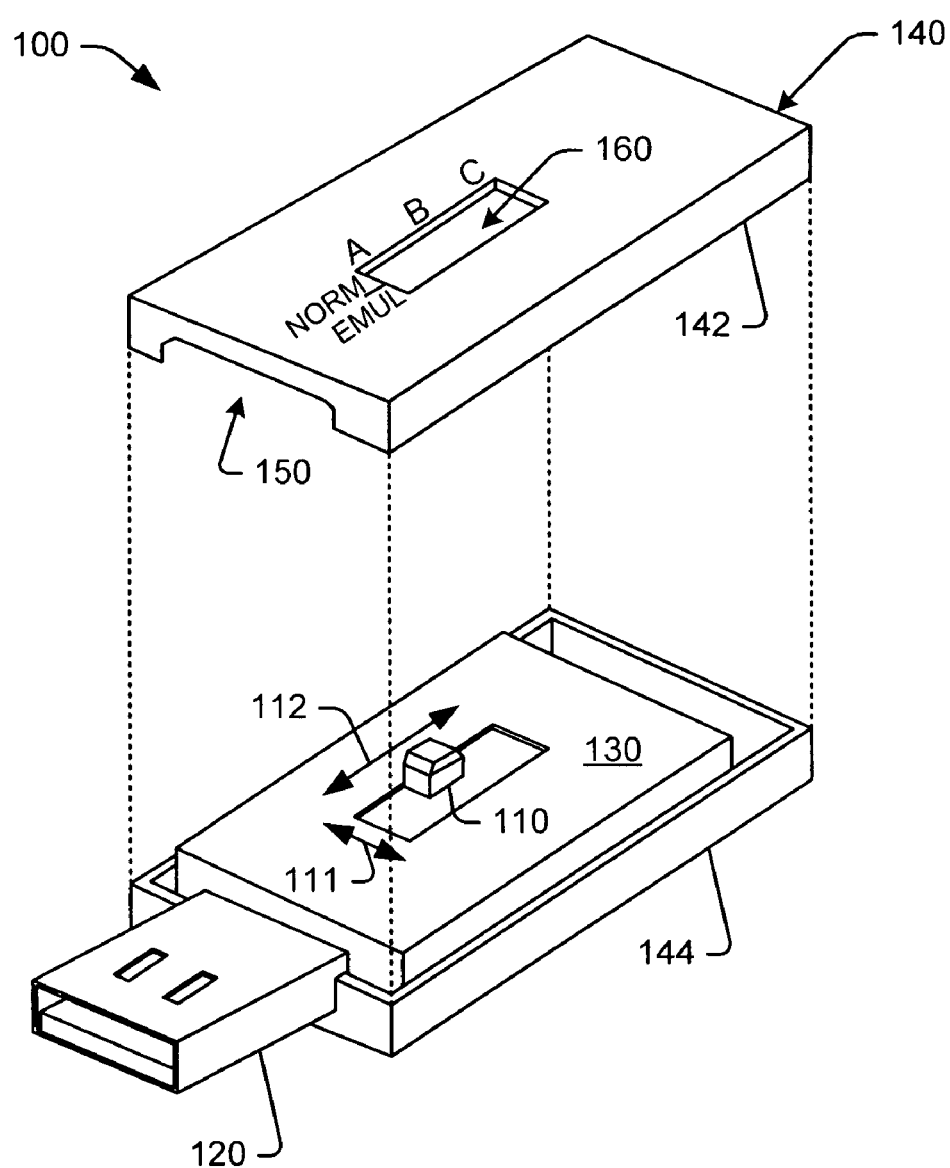
FIG. 1 is an exploded perspective view of an exemplary portable storage device having a mechanical switching element.

FIG. 1 is an exploded perspective view of an exemplary portable storage device 100 having a mechanical switching element 110. Exemplary portable storage device 100 is shown as it may be implemented as a USB drive or "thumb drive". The USB drive is so named because it can be physically connected via a USB connection 120 to a USB port on a computer system (e.g., a personal computer (PC), network station, network server, etc.). It is noted, however, that other connections are also contemplated for the portable storage device 100, and therefore is not limited to implementation as a USB drive.

Exemplary portable storage device 100 may include an inner housing 130 for shielding memory, a microprocessor, and other electronic components described in more detail below with reference to FIG. 3. Optionally, an external housing 140 may also be provided for additional shielding and/or to make the portable storage device 100 easy for a user to grasp, make it aesthetically pleasing, etc. For example, thumb drives are readily commercially available in a wide variety of different shapes, sizes, and colors, for use as key chains, etc.

As shown in FIG. 1, the outer housing 140 may comprise a top portion 142 and a bottom portion 144 configured with a first opening 150 formed through the outer housing 140 such that the inner housing 130 can be positioned inside the outer housing 140 with the USB connection 120 extending through the first opening 150 after assembly of the top portion 142 and bottom portion 144 of the outer housing 140. In addition, the top portion 142 of the outer housing 140 may also comprise a second opening 160 formed through the outer housing 140 such that the mechanical switching element 110 extends through the opening 160 after assembly of the top portion 142 and bottom portion 144 of the outer housing 140.

In an exemplary embodiment, the mechanical switching element 110 may be used to select different image files stored in memory on the portable storage device 100. The mechanical switching element 110 may also be used to select between different modes of operation. Alternatively, separate switching elements (not shown) may be used for the separate functions of file selection and mode selection.

The selection mechanisms are explained in more detail below with reference to FIG. 3. For now, it is enough to understand that the mechanical switching element 110 may be implemented as a switch for coupling and de-coupling one or more electrical signals based upon the physical position of the switch. The switch positions enable the user to select between different modes of operation and between different image files stored in memory on the portable storage device 100. For example, the user may move the switching element 110 in the direction illustrated by arrow 111 between the switch positions labeled "NORM" and "EMUL" to select a mode of operation. For example, the user may select "NORM" mode to use the portable storage device 100 as a conventional USB drive, e.g., for reading/writing image files or other information to the portable storage device 100. Or the user may select "EMUL" mode to emulate a CD or DVD (or other removable memory device), e.g., for installing software contained in an image file stored on the portable storage device 100.

The user may also move the switching element 110 in the direction illustrated by arrow 112 between the switch positions labeled A, B, and C to select different image files stored on the portable storage device 100. For example, the user may select "A" for an operating system image file, "B" for a system recovery file, or "C" for application software.

It is readily apparent that the switching element 110 enables a user to configure the portable storage device independent of a computer system. That is, the user can configure the portable storage device 100 as either a conventional USB drive or as a removable drive emulator. In addition, the user can browse the contents of the portable storage device 100 without having to connect the portable storage device 100 to a computer system and use external software.

It is noted that the portable storage device 100 is not limited to use with any particular type of switching element. Another embodiment of an exemplary portable storage device is shown in FIG. 2.

Figure 2:
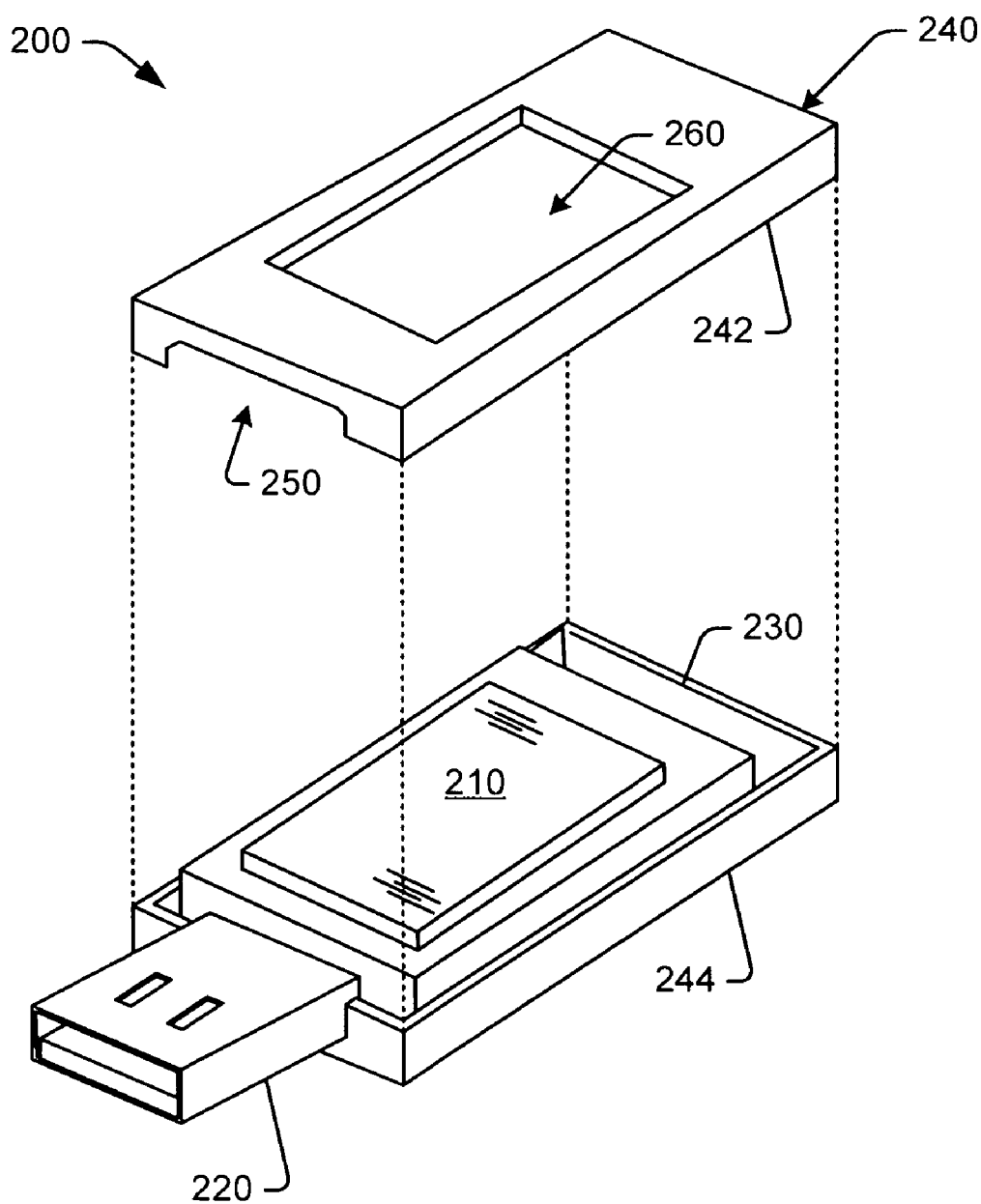
FIG. 2 is an exploded perspective view of another exemplary portable storage device having a logical switching element.

FIG. 2 is an exploded perspective view of another exemplary portable storage device 200 having a logical switching element 210. It is noted that similar components already described above for the exemplary portable storage device 100 are referred to by 200-series reference numbers and may not be described again with reference to the embodiment shown in FIG. 2.

In an exemplary embodiment, logical switching element 210 may be implemented, e.g., as a touch-screen liquid crystal display (LCD). The LCD display may display different selections for a user (e.g., different image files that can be selected by the user using a stylus or other input device). The LCD display may also receive user input corresponding to the user's selection. Of course it is noted that the logical switching element 210 is not limited to use with touch-screen LCDs.

The logical switching element 210 differs from the mechanical switching element 110 shown in FIG. 1 in that a microprocessor and firmware are implemented to logically connect and disconnect to memory locations based upon the user's selections. For example, a table or other suitable data structure may point to a location in memory corresponding to the first image file if the user selects image file A from the LCD, to a location in memory corresponding to the second image file if the user selects image file B from the LCD, and so forth. When the user makes a selection, the firmware executing on the microprocessor accesses the location in memory corresponding to the user's selection.

The electronics and program code for implementing the portable storage devices are described in more detail below with reference to FIG. 3. Before continuing, however, it is noted that the embodiments of portable storage devices 100 and 200 described above with reference to FIGS. 1 and 2, respectively, are provided only for purposes of illustration. Other embodiments are also contemplated, as will be readily appreciated by those having ordinary skill in the art after becoming familiar with the teachings herein. For example, the portable storage device is not limited to use with any particular number of switch positions. Any number of switch positions corresponding to any number of image files may be implemented. Nor is the portable storage device limited to use with any particular switch position labels. Other, more descriptive labels, may also be used, such as, e.g., "OS" for operating system, "Patch" for software updates, "App1" and "App2" for different applications, "Data" for data files, etc. Still other embodiments are also contemplated.

Figure 3:
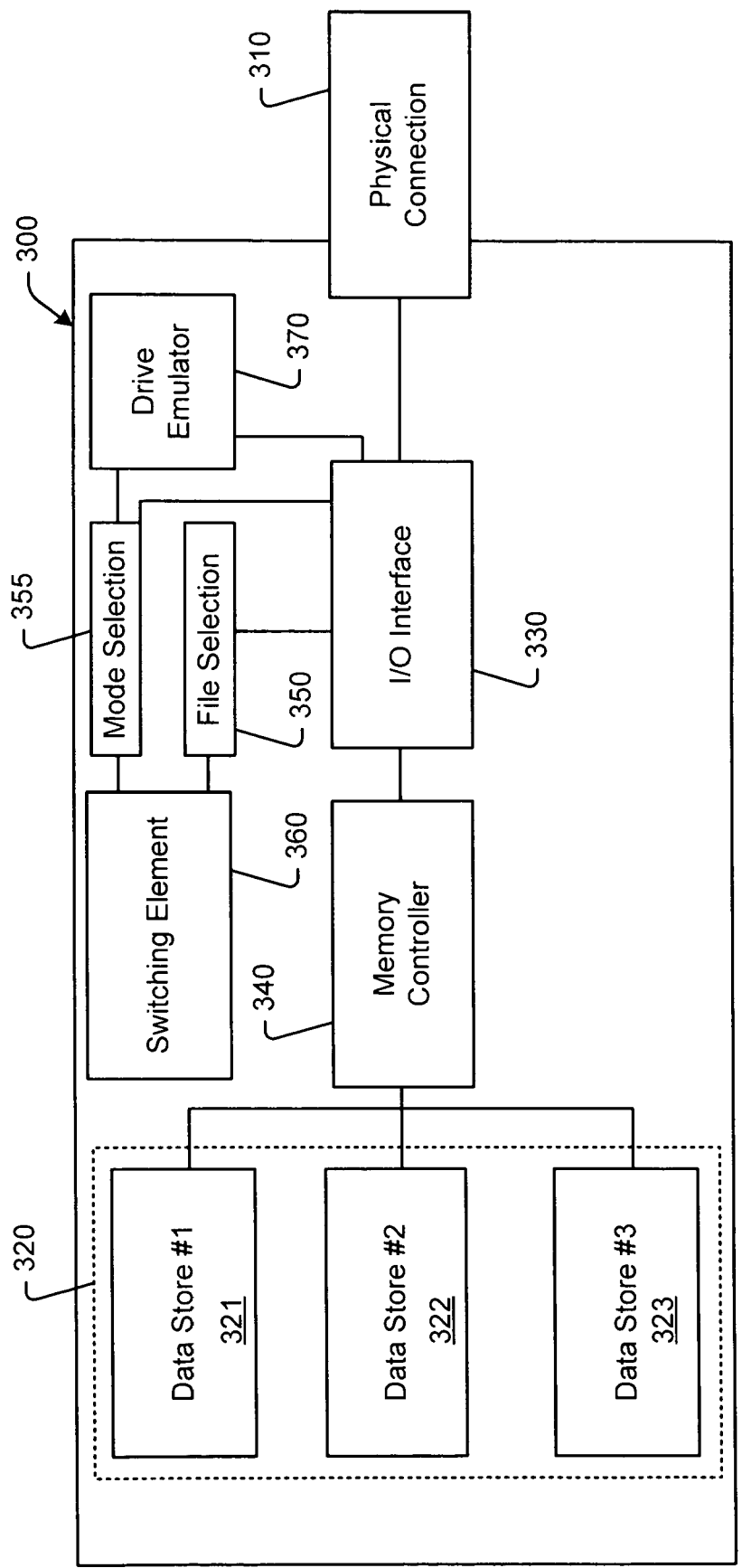
FIG. 3 is a high-level functional block diagram of an exemplary portable storage device.

FIG. 3 is a high-level functional block diagram of an exemplary portable storage device 300 (such as the portable storage devices 100 and 200 in FIGS. 1 and 2). Portable storage device 300 may include a physical connection 310 for connecting to a computer system. For example, the physical connection 310 may be a USB connection such as the USB connections 120 and 220 shown in FIGS. 1 and 2, respectively. Portable storage device 300 may also include memory 320.

In an exemplary embodiment, memory 320 may be implemented as flash memory. Flash memory offers the advantages of read-only memory (ROM) in that flash memory continues to store information even in the absence of a power source. Flash memory also offers the advantages of random-access memory (RAM) in that the contents of flash memory can be written to and erased. Flash memory is commonly used in USB drives, however, other types of memory now known or later developed may also be implemented as the memory 320.

Memory 320 may include one or more data stores 321-323. The term "data store" as used herein refers to individually addressable spaces in memory 320. For example, data stores may be separate partitions (or other logical spaces) on a single physical memory. Or for example, the data stores may each be provided on separate physical memory components. In any event, separate image files may be stored on each data store 321-323 so that the image files can be selected directly from the portable memory device 300 (e.g., via switching element 110 or 210 in FIGS. 1 and 2) without the need for external software.

The data stores 321-323 may be accessed by coupling communications (e.g., read/write requests) received at the physical connection 310 to memory 320 via an I/O interface 330 and memory controller 340. I/O interface 330 may also receive input from a file selection module 350 and a mode selection module 355, each operatively associated with the switching element 360 (e.g., the switching elements 110 and 210 in FIGS. 1 and 2). That is, file selection module 350 may identify the user's file selection to the I/O interface 330 based on the switch position (or other user input). In addition, mode selection module 355 may identify the user's desired mode of operation to the I/O interface 330 based on the switch position (or other user input). Accordingly, memory controller 340 can properly map read/write requests to the corresponding data store 321-323.

The portable storage device 300 may also be implemented to emulate a removable media drive on a computer system (e.g., a CD or DVD drive). Emulating a removable media drive enables the portable storage device 300 to be used as a bootable drive, e.g., as specified in the built-in input/output system (BIOS). When a computer system is booted from the portable storage device 300, boot files can be accessed from memory 320 just as these files would be accessed from a bootable CD or DVD disk in a bootable drive.

In an exemplary embodiment, a drive emulator 370 may be provided in communication with the I/O interface to emulate communications between the IO interface 330 on the portable storage device 300 and the computer system it is connected to when the portable storage device 300 is in emulate mode. Drive emulator 370 may be implemented in program code (e.g., firmware) stored in memory and executable by a processor or processing units (e.g., microprocessor) on the portable storage device 300. Drive emulator 370 may be invoked by the user, e.g., using switching element 360.

When in emulate mode, the drive emulator 370 operates with the I/O interface to emulate a removable media drive by translating read requests from the computer system into commands for redirecting to the corresponding offsets within the image file to access the contents of the image file. Drive emulator 370 may also cause the I/O interface to return emulated removable media drive responses to the computer system. Accordingly, the image files may be accessed just as these would be accessed on a CD or DVD disk.

FIG. 4 is a flowchart illustrating exemplary operations for configuring a portable storage device, e.g., independent of a computer system and/or external software. Operations 400 may be embodied as logic instructions (e.g., firmware) on one or more computer-readable medium. When executed by a processor, the logic instructions implement the described operations. In an exemplary implementation, the components and connections depicted in the figures may be used for configuring a portable storage device.

In operation 410, a mode of operation is selected for a portable storage device. For example, user input from a switching element may be received on a portable storage device indicating a mode of operation of the portable storage device. In operation 420, a file is selected on the portable storage device. For example, user input from the switching element may be received on the portable storage device indicating a file selection for one of a plurality of image files stored on the portable storage device. In exemplary embodiments, both operations 410 and 420 are executed independent of a separate computer system and/or external software. That is, the operations are executed on the portable storage device itself as a stand-alone device, even if the portable storage device is connected to a computer system.

In operation 430, a determination is made whether to emulate a removable media drive on a computer system, e.g., based on the mode of operation as selected in operation 410. Access to the portable storage device can then be provided to the selected image file based on the selected mode of operation. If drive emulation is not selected, read/write access may be provided in operation 431. If drive emulation is selected, emulated drive access (e.g., emulating a CD or DVD drive) may be provided in operation 432.

The operations shown and described herein are provided to illustrate exemplary embodiments for configuring a portable storage device. It is noted that the operations are not limited to the ordering shown and other operations may also be implemented.

It is noted that the exemplary embodiments shown and described are provided for purposes of illustration and are not intended to be limiting. Still other embodiments are also contemplated.

The invention claimed is:

1. A portable storage device, comprising:
   a USB connection for connecting a memory component in the portable storage device to a separate computer system;
   an I/O interface for translating electrical signals received from the separate computer system by the USB connection into read/write requests at the portable storage device based on a user-selected mode of operation;
   a memory controller operatively associated with the I/O interface, the memory controller handling the read/write requests to provide access by the computer system to a plurality of image files stored in the memory component; and
   a switching element, the switching element operable by a user to select between different modes of operation, wherein the modes of operation are a read/write mode and a drive-emulating mode.

2. The portable storage device of claim 1, further comprising a mode selection module operatively associated with the I/O interface and the switching element, the mode selection module determining a user selection based on a position of the switching element.

3. The portable storage device of claim 1, further comprising a switching element, the switching element operable by a user to select one of the plurality of image files stored in the memory component independent of the separate computer system.

4. The portable storage device of claim 3, further comprising a file selection module operatively associated with the I/O interface and the switching element, the file selection module determining a user selection based on a position of the switching element.

5. The portable storage device of claim 1, wherein the memory component includes a plurality of individual data stores, each data store configured to store only one of the plurality of image files.

6. The portable storage device of claim 1, further comprising a switching element, the switching element operable by a user to select between different modes of operation, and the same switching element operable to the user to select one of the plurality of image files stored in the memory component.

7. A portable storage device, comprising:
   a memory component;
   a USB connection for connecting the memory component to a separate computer system; and
   at least one switching element operatively associated with the memory component, the at least one switching element operable by a user to select between at least different modes of operation; and
   translating electrical signals received from the separate computer system by the USB connection into read/write requests at the portable storage device based on the different modes of operation, wherein the modes of operation are a read/write mode and a drive-emulating mode.

8. The portable storage device of claim 7, wherein the at least one switching element is operable by the user to select one of the plurality of image files stored in the memory component.

9. The portable storage device of claim 7, further comprising a separate switching element operable by the user to select one of the plurality of image files stored in the memory component.

10. The portable storage device of claim 7, further comprising a memory controller operatively associated with the I/O interface, the memory controller handling read/write requests to provide access by the computer system to a plurality of image files stored in the memory component based on the selected mode of operation.

11. The portable storage device of claim 7, wherein the at least one switching element is a mechanical switching element.

12. The portable storage device of claim 7, wherein the at least one switching element is a logical switching element.

13. A method for configuring a portable storage device, comprising:
   receiving user input on the portable storage device indicating a mode of operation of the portable storage device, wherein the modes of operation are a read/write mode and a drive-emulating mode;
   receiving user input on the portable storage device indicating a file selection for one of a plurality of image files stored on the portable storage device; and
   providing access by an external computer system to the selected image file based on the selected mode of operation.

14. The method of claim 13, wherein providing access emulates a removable media drive on the external computer system.

15. The method of claim 13, wherein providing access handles read/write operations between the portable storage device and the external computer system.

16. The method of claim 13, further comprising configuring the portable storage device based on the user input independent of the external computer system.

17. The method of claim 13, wherein the user input is received from either a mechanical switching element on the portable storage device or a logical switching element on the device.

18. A portable storage device, comprising:
a USB connection for connecting a memory component in the portable storage device to a separate computer system;
an I/O interface for translating electrical signals received from the separate computer system by the USB connection into read/write requests at the portable storage device based on a user-selected mode of operation;
a memory controller operatively associated with the I/O interface, the memory controller handling the read/write requests to provide access by the computer system to a plurality of image files stored in the memory component, wherein the memory component includes a plurality of individual data stores, each data store configured to store only one of the plurality of image files.

* * * * *